United States Patent [19]

Hodgkins

[11] 4,126,557
[45] Nov. 21, 1978

[54] FUEL OIL FILTER

[75] Inventor: David H. Hodgkins, Manchester, Conn.

[73] Assignee: Stanadyne, Inc., Hartford, Conn.

[21] Appl. No.: 789,452

[22] Filed: Apr. 21, 1977

[51] Int. Cl.² .......................................... B01D 35/00
[52] U.S. Cl. ................................... 210/249; 210/493 R
[58] Field of Search .................... 210/249, 455, 493 R, 210/493B; 248/94, 223, 342, 222.4, 223.1, 223.2; 403/461, 41, 709, 311

[56] References Cited

U.S. PATENT DOCUMENTS

| | | | |
|---|---|---|---|
| 2,307,507 | 1/1943 | Hutton | 403/361 X |
| 2,633,991 | 4/1953 | Beatty | 210/249 X |
| 3,189,179 | 6/1965 | McMichael | 210/493 X |
| 3,864,265 | 2/1975 | Markley | 210/493 X |

FOREIGN PATENT DOCUMENTS

452,193  10/1948  Canada ..................... 248/324

*Primary Examiner*—William A. Cuchlinski, Jr.

*Attorney, Agent, or Firm*—Prutzman, Kalb, Chilton & Alix

[57] ABSTRACT

A totally enclosed fuel oil filter housing having a fuel inlet nipple and a fuel outlet nipple is assembled on a mounting bracket with the nipples extending through hexagonal apertures in the mounting bracket. The inlet and outlet nipples are threaded to couple connecting fuel lines and are of different sizes to prevent a reversal of the connections. The nipples have hexagonal peripheries which mate the apertures so that torsional forces during coupling are transmitted to the bracket rather than to the seals between the nipples and the filter housing, and the apertures of the mounting bracket are formed by being drawn out of the plane of the base of the mounting bracket to project therefrom. The side walls of the housing has inwardly directed ribs and a bead of sealant spans each rib to localize the pressure between the side walls of the housing and the accordion pleated filter medium through the sealant bead to assure a void-free seal therebetween.

9 Claims, 4 Drawing Figures

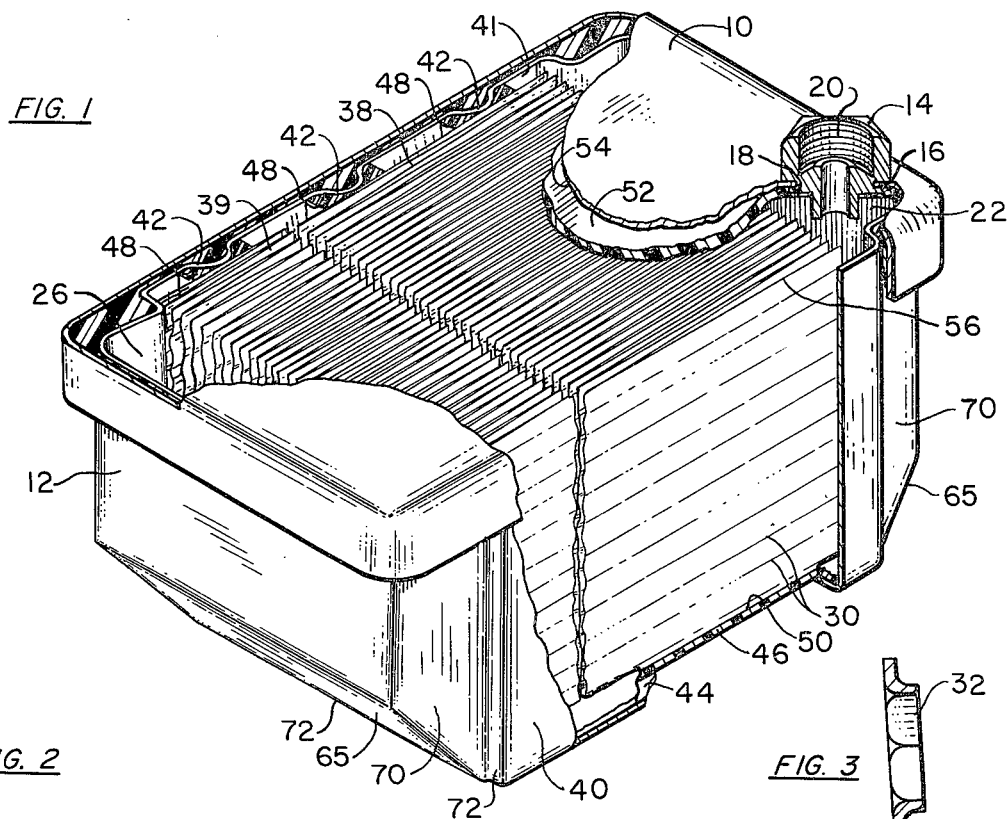
FIG. 1
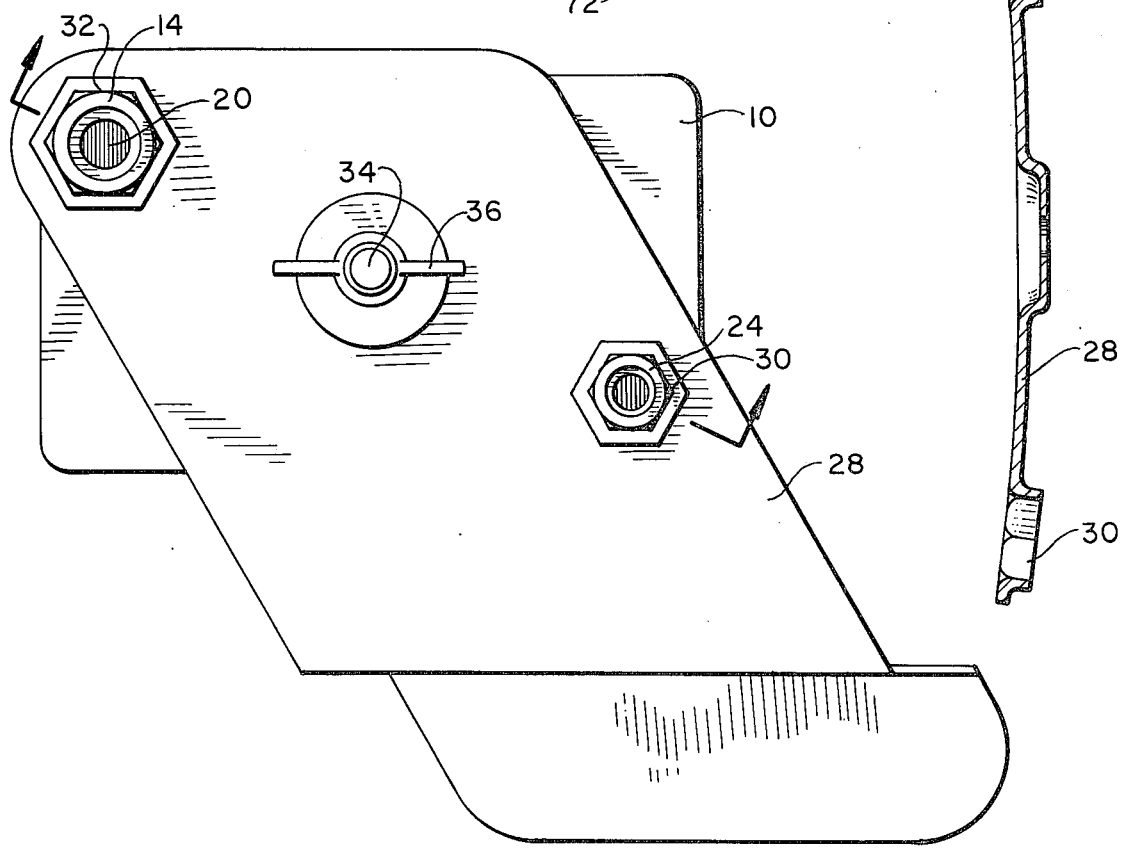
FIG. 2
FIG. 3

FUEL OIL FILTER

This invention relates to fuel oil filters and more particularly to a low cost fuel oil filter of small size and high capacity to require infrequent replacement during the life of an engine with which it is used.

A significant amount of abrasive particles is often found in the fuel oil used in diesel engines. If such particles, which may be as small as ten microns in size, are not removed prior to the delivery of the fuel oil to a high pressure fuel injection pump having parts, such as pumping plungers, which fit with close tolerances so that the high pressures required for fuel injection can be generated, wear will occur and adequate pressure cannot be generated, particularly at low starting speeds. In addition, fuel oil used in diesel engines often contains a substantial amount of heavy components such as asphalt which choke the filtering pores of a filter in proportion to the amount of fuel oil passing through the filter so that a large area of filter paper is required if the filter is to have a long life.

It is the principal object of this invention to provide an improved replaceable cartridge for filtering the solid abrasive particles from fuel delivered to the high pressure pump of a diesel fuel injection system which is low in cost, small in size and has a long life obviating the necessity for frequent replacement.

Another object of the invention is to provide a novel improved unitary filter cartridge which does not require an expensively fabricated mounting base. Included in this object is the inclusion of means to prevent the filter from being installed in a reverse flow direction.

A further object of the invention is to provide an improved filter having a high filter capacity and a relatively small volumetric space which can be produced at low cost.

Another object of this invention is to provide a filter assembly having threaded nipples wherein means are provided for preventing the transmission of the coupling forces to the joint between the nipples on the filter and the filter housing.

Other objects will be in part obvious and in part pointed out more in detail hereinafter.

A better understanding of the invention will be obtained from the following detailed description and the accompanying drawings of an illustrative application of the invention.

In the drawings:

FIG. 1 is a perspective view of a filter incorporating a preferred embodiment of the present invention;

FIG. 2 is a side view of the filter of FIG. 1 showing the filter of FIG. 1 mounted on a support;

FIG. 3 is a fragmentary cross-sectional view of the support taken along the line 3—3 of FIG. 2.

Figure 4:
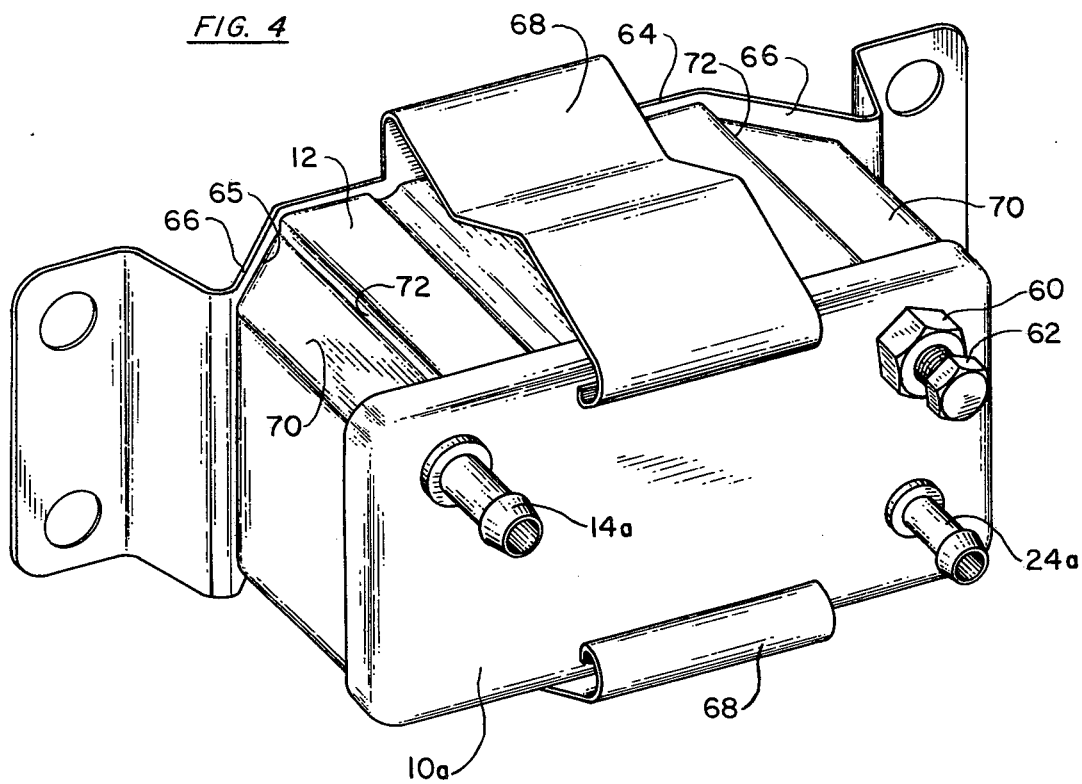
FIG. 4 is a perspective view of another preferred embodiment of the invention having a different mounting means.

Referring now to the drawings in detail wherein like numerals are used to designate like parts, FIG. 1 illustrates a unitary filter having a generally rectangular cup-shaped filter housing 12 with a base 10 permanently secured thereto so as to provide a leakproof housing assembly. As shown in FIG. 1, the base 10 is provided with a threaded inlet nipple 14 having a cylindrical extension 18 extending through an opening 16 in the base and secured thereto as by spinning to non-rotatably seal the nipple to the base. The passage 20 through the nipple 14 communicates with an inlet chamber 22 for the delivery of fuel oil to the filter. Similarly, a threaded outlet nipple 24 (FIG. 2) is mounted in an opening in the base 10 at the opposite end of the filter and communicates with the chamber 26 into which the filtered fuel oil passes after being filtered.

As best seen in FIG. 2, the threaded nipples 14 and 24 are of different sizes for connection of fuel lines of different sizes thereby to prevent the connection of the inlet chamber 22 to the downstream fuel line to discharge the previously filtered abrasive particles from the filter.

As shown, the outlet nipple 24 is mounted by the mounting bracket 28 so that it is located at a lower point than the inlet 20 so that any water particles entrained in the fuel are not trapped in the filter where the accumulated water may freeze and clog the filter. In addition, this manner of mounting the filter assures that the presence of air in the filter when it is first installed will not produce an air lock preventing the delivery of fuel from the filter.

In the embodiment of FIGS. 1 and 2, it will be noted that the mounting bracket 28, which may be attached to the engine or in the engine compartment in any suitable manner, is provided with non-circular openings (shown as being hexagonal openings 30 and 32) which engage the corresponding non-circular or hexagonal nipples 14 and 24. By this arrangement, the bracket 28, in addition to mounting the filter element, also serves to prevent the transmission of torque to the spun connection sealing the nipples 14, 24 to the filter base 10 thereby assuring that the connection of the filter to the fuel line will not cause damage to the filter element and cause leakage.

Means are provided for securing the filter element to the support bracket 28. As shown, a stud 34 is secured to the filter base 10 and passes through an aperture in the support bracket 28 where it is secured as by a wing nut 36. Preferably, the bracket is bowed to provide a clearance between it and the base 10 adjacent the stud 34 so that the bracket is tightly biased against the base 10 by the wing nut.

As best shown in FIG. 1, the filter paper comprises a plurality of folds of accordian pleated paper 38. Preferably, the paper is longitudinally corrugated to provide channels into the space between the adjacent folds of paper as well as an inherent biasing force toward the four surrounding walls of the housing. While the paper utilized is selected to have a pore size of ten microns or less, there is provided in the illustrated embodiment, a filter unit having two similar accordian pleated filter paper masses disposed in series with each other in order to offer additional assurance against the passage of abrasive particles.

As shown, the accordian pleated filter paper mass 39 disposed downstream of the accordian pleated filter paper mass 38 has a surface area which is about one half that of filter paper mass 38.

Also as best shown in FIG. 1, the opposite side walls 40 and 41 of the filter housing are provided with inwardly raised ribs 42 which extend generally parallel to each other from the open end of the cup-shaped housing member 12 fully to the bottom wall 44 thereof.

In the assembly of the filter, a heat curable plastisol is applied to the entire surface of the bottom wall 44 of the filter to form the layer 46 as shown in FIG. 1. In addition, a bead of such plastisol of, say 0.060 inch thick, is applied to the paper to align with each of the ribs 42. Thereafter, the pleated paper masses 38 and 39 are compressed and inserted into the cup-shaped housing member 12 until the lower edge 50 of the paper is submerged in the then fluid layer 46 of the plastisol. Upon releasing the compressive force on the folded paper masses 38 and 39, the inherent resilience thereof will bias the end folds of each paper mass against the ribs 42 so that the plastisol beads form an unbroken seal therebetween despite the longitudinal corrugations 30 of the accordian pleated paper. A layer of flowable plastisol 52 is also applied to the inner surface 54 of the base 10 and the filter housing 12 with the paper masses 38, 39 positioned therein is assembled on the base 10.

Because of the longitudinal corrugations 30, the edge 56 of the pleated paper is biased into a submerged position with respect to the plastisol layer 52 so that when the plastisol is cured as by heating, the beads of plastisol 48 together with the layers of plastisol 52 and 46 prevent the bypass of fuel around the paper masses 38, 39 from the chamber 22 to the chamber 27 of the filter.

Because the cured layer 52 of plastisol engages the projections 18 of the nipples, it serves to help seal the nipple 14 to the filter base 10 as well as to resist any mechanical forces serving to rotate the nipple 14 with respect to base 10.

It will be observed in FIG. 1 that the end walls of the filter housing 12 are angled toward the bottom wall 44 thereof as shown at 65 and that the side walls at each of the four corners are recessed as at 70 to form aligned abutments in a single plane to serve as locators for the end edges of the pleated paper masses 38 and 39 respectively during assembly.

FIG. 4 shows another preferred embodiment of the invention having push-on nipples 14a, 24a for receiving the fuel lines. The internal construction of the filter of this embodiment is essentially the same as that of the embodiment of FIG. 1 and it will be noted that the nipple 14a is of a different size (i.e., larger) than the nipple 24a so as to prevent the assembly of the filter in a reverse flow direction. In this embodiment, there is shown an optional nipple 60 which cooperates with a bleed valve 62 to purge the air entrained in the nozzle at the time of assembly, if desired. The fuel lines mating with nipples 14a and 24a are preferably formed of resilient tubing which may be sealed with respect to the nozzle by conventional spring wire clamps. As shown, the angled ends 65 of the wall of the housing 12 opposite the base 10a are nested in a mounting bracket 64 which has mating wall portions 66 to prevent the longitudinal movement of the filter housing 12 with respect to the bracket 64. In addition, the mounting bracket 64 is provided with a pair of resilient cantilever clamp members 68 which clamp the filter assembly to the mounting bracket 64 while leaving the nipples 14a, 24a as well as the free ends of the clamp members 68 exposed for disconnecting the filter from the fuel line and for replacing a spent filter.

As will be apparent to persons skilled in the art, various modifications, variations and adaptations of the specific disclosure can be made without departing from the teachings of the present invention.

I claim:

1. A totally enclosed disposable filter housing having an inlet chamber and an outlet chamber separated by a filtering medium, said filtering medium comprising a plurality of pleats of accordian pleated filter paper, the side walls of said housing having inwardly directed ribs intermediate the ends thereof, each of said ribs forming a narrow ridge projecting from said side walls, beads of a settable sealant on the end pleats of the filter paper covering and spanning said ribs to provide a construction wherein the inherent resilience of the pleated filter paper biases the beads on the end pleats of the filter paper into contact with the ribs during the curing thereof.

2. The device of claim 1 wherein the filter medium is longitudinally corrugated in a direction perpendicular to the fold lines of the pleats and the longitudinal edges thereof are submerged in such layers during the curing of the sealant.

3. The method of making a totally enclosed filter comprising the steps of providing a generally rectangular cup-shaped member, forming inwardly directed ribs intermediate the ends of the opposing side walls thereof and forming a narrow ridge projecting from said side walls, applying a layer of a heat curing sealant to coat the bottom wall of the cup-shaped member, applying beads of sealant on said inwardly directed ribs to cover and span the tops thereof, compressing an accordian pleated filter medium for insertion into the cup-shaped housing, releasing the pressure on the pleated filter medium to self-bias the same into engagement with the sealant on said ribs, applying a layer of sealant on a base, assembling the base in engagement with the open end of the housing and with the exposed edge of the pleated filter medium and curing the sealant to seal the base to the housing and to provide an unbroken band of adhesive surrounding the filter element thereby to prevent the bypass of fuel oil around the filter medium.

4. A fuel oil filter assembly comprising a totally enclosed housing having an inlet nipple and an outlet nipple and a mounting flange for mounting the filter housing, said nipples being non-rotatably sealed to said housing and threaded to receive mating threaded couplings provided on the connecting fuel lines, said mounting flange having non-circular apertures therethrough and said nipples having mating non-circular peripheries non-rotatably received in said apertures to transmit the torsional forces applied to the nipples during the attachment of the fuel lines to the mounting flange and prevent the transmission of torsional forces from the nipples to the housing.

5. The device of claim 4 including means for removably securing the filter housing in assembled position on the mounting flange.

6. The device of claim 4 wherein said inlet nipple is disposed above said outlet nipple so that water entrained in the fuel entering the filter will not be trapped therein.

7. The device of claim 4 wherein the inlet and outlet nipples are of different size to prevent a reversal of the attachment of the connecting fuel lines thereto.

8. The device of claim 4 wherein the non-circular peripheries of said inlet and outlet nipples are of different size to assure the mounting of the filter with a single orientation with respect to the mounting flange.

9. The device of claim 4 wherein said apertures in the mounting flange are drawn out of the plane of the base of the mounting flange to project therefrom.

* * * * *